(12) United States Patent
Fujimura et al.

(10) Patent No.: US 8,221,004 B2
(45) Date of Patent: Jul. 17, 2012

(54) METHOD OF MAKING WHEEL SUPPORT BEARING

(75) Inventors: Akira Fujimura, Iwata (JP); Kazuo Komori, Iwata (JP); Kazunori Kubota, Iwata (JP); Tetsuya Hashimoto, Iwata (JP); Keiji Saitou, Iwata (JP)

(73) Assignee: NTN Corporation, Osaka (JP)

( * ) Notice: Subject to any disclaimer, the term of this patent is extended or adjusted under 35 U.S.C. 154(b) by 357 days.

(21) Appl. No.: 12/448,946

(22) PCT Filed: Jan. 15, 2008

(86) PCT No.: PCT/JP2008/000024
§ 371 (c)(1),
(2), (4) Date: Jul. 16, 2009

(87) PCT Pub. No.: WO2008/087857
PCT Pub. Date: Jul. 24, 2008

(65) Prior Publication Data
US 2010/0278468 A1  Nov. 4, 2010

(30) Foreign Application Priority Data
Jan. 17, 2007 (JP) ................. 2007-008075

(51) Int. Cl.
*F16C 43/04* (2006.01)
*B21D 53/10* (2006.01)

(52) U.S. Cl. .................... 384/544; 29/898.064

(58) Field of Classification Search ............... 384/544, 384/589; 29/898.064
See application file for complete search history.

(56) References Cited

U.S. PATENT DOCUMENTS

| | | | |
|---|---|---|---|
| 4,887,917 A | 12/1989 | Tröster et al. | |
| 4,893,960 A | 1/1990 | Beier et al. | |
| 5,226,738 A | 7/1993 | Valette et al. | |
| 5,975,765 A | 11/1999 | Kawamura | |
| 6,022,275 A | 2/2000 | Bertetti | |
| 6,105,251 A | 8/2000 | Payen | |
| 6,280,096 B1 | 8/2001 | Miyazaki et al. | |
| 6,422,758 B1 | 7/2002 | Miyazaki et al. | |
| 6,485,187 B1 | 11/2002 | Meeker et al. | |
| 6,497,515 B1 | 12/2002 | Sahashi et al. | |
| 6,524,011 B2 | 2/2003 | Miyazaki et al. | |

(Continued)

FOREIGN PATENT DOCUMENTS

DE    3418440 A1    11/1985

(Continued)

OTHER PUBLICATIONS

Japanese Office Action issued Nov. 4, 2009 in corresponding Japanese Patent Application 2005-162380.

(Continued)

*Primary Examiner* — Thomas R Hannon

(57) ABSTRACT

A support bearing assembly includes a plural rows of rolling elements between opposed raceway surfaces of outer and inner members, respectively. The inner member is formed from a hub unit and an inner ring mounted on an outer periphery of an inboard end portion thereof. An annular stepped area is provided in an inner periphery of the inboard side of the inner ring. A crimped portion engageable with the stepped area is provided on an inboard end of the hub unit and has a cylindrical shape prior to a crimping process. By setting the amount of change in an inner diameter of the inboard end of the crimped portion within a preset range when a crimping punch is driven in, the amount of radially outward augmentation of the crimped portion is regulated.

2 Claims, 8 Drawing Sheets

U.S. PATENT DOCUMENTS

| | | | |
|---|---|---|---|
| 6,574,865 | B2 | 6/2003 | Meeker et al. |
| 6,575,637 | B1 | 6/2003 | Tajima et al. |
| 6,585,420 | B2 | 7/2003 | Okada et al. |
| 6,672,679 | B2 | 1/2004 | Kaneko |
| 6,672,770 | B2 | 1/2004 | Miyazaki et al. |
| 6,702,472 | B2 | 3/2004 | Sera et al. |
| 6,715,926 | B2 | 4/2004 | Tajima et al. |
| 6,761,486 | B2 | 7/2004 | Miyazaki et al. |
| 6,796,714 | B2 | 9/2004 | Ohkuma et al. |
| 6,879,149 | B2 | 4/2005 | Okada et al. |
| 7,695,195 | B2 | 4/2010 | Okasaka |
| 7,866,893 | B2 | 1/2011 | Ohtsuki |
| 7,874,734 | B2 | 1/2011 | Komori et al. |
| 7,883,272 | B2 | 2/2011 | Kiuchi et al. |
| 2001/0019223 | A1 | 9/2001 | Kaneko |
| 2001/0046339 | A1 | 11/2001 | Miyazaki et al. |
| 2002/0051597 | A1 | 5/2002 | Sera et al. |
| 2002/0068639 | A1 | 6/2002 | Tajima et al. |
| 2002/0085781 | A1 | 7/2002 | Ohkuma et al. |
| 2002/0110300 | A1 | 8/2002 | Meeker et al. |
| 2002/0146185 | A1 | 10/2002 | Miyazaki et al. |
| 2003/0002761 | A1 | 1/2003 | Hagiwara |
| 2003/0081872 | A1 | 5/2003 | Sahashi et al. |
| 2003/0103705 | A1 | 6/2003 | Miyazaki et al. |
| 2004/0037482 | A1 | 2/2004 | Ouchi |
| 2004/0120622 | A1 | 6/2004 | Tajima et al. |
| 2005/0094912 | A1 | 5/2005 | Ouchi |
| 2005/0141798 | A1 | 6/2005 | Okasaka |
| 2006/0239600 | A1 | 10/2006 | Shigeoka et al. |
| 2006/0274986 | A1 | 12/2006 | Komori et al. |
| 2008/0089628 | A1 | 4/2008 | Kiuchi et al. |
| 2008/0247700 | A1 | 10/2008 | Komori et al. |
| 2008/0310784 | A1 | 12/2008 | Ohtsuki |
| 2010/0278468 | A1 | 11/2010 | Fujimura et al. |

FOREIGN PATENT DOCUMENTS

| | | |
|---|---|---|
| EP | 1 729 021 A1 | 12/2006 |
| JP | 63-184501 | 7/1988 |
| JP | 7-118682 | 5/1995 |
| JP | 9-164803 | 6/1997 |
| JP | 09-220904 | 8/1997 |
| JP | 10-095203 | 4/1998 |
| JP | 10-196661 | 7/1998 |
| JP | 11-78408 | 3/1999 |
| JP | 11-129703 | 5/1999 |
| JP | 2001-001708 | 1/2001 |
| JP | 2001-1710 | 1/2001 |
| JP | 2001-171309 | 6/2001 |
| JP | 2001-180210 | 7/2001 |
| JP | 2001-233001 | 8/2001 |
| JP | 2002-139060 | 5/2002 |
| JP | 2002-178706 | 6/2002 |
| JP | 2002-192264 | 7/2002 |
| JP | 2002-250358 | 9/2002 |
| JP | 2002-254132 | 9/2002 |
| JP | 2002-283804 | 10/2002 |
| JP | 2002-33959 | 11/2002 |
| JP | 2002-372548 | 12/2002 |
| JP | 2003-42173 | 2/2003 |
| JP | 2003-074571 | 3/2003 |
| JP | 2003-090334 | 3/2003 |
| JP | 2003-97588 | 4/2003 |
| JP | 2004-132552 | 4/2004 |
| JP | 2004-256039 | 9/2004 |
| JP | 2005-036905 | 2/2005 |
| JP | 2005-48839 | 2/2005 |
| JP | 2005-106215 | 4/2005 |
| JP | 2005-138653 | 6/2005 |
| JP | 2005-188599 | 7/2005 |
| JP | 2005-233402 | 9/2005 |
| JP | 2006-52817 | 2/2006 |
| JP | 2006-105343 | 4/2006 |
| JP | 2006-112516 | 4/2006 |
| JP | 2006-118548 | 5/2006 |
| JP | 2006-161856 | 6/2006 |
| JP | 2006-161970 | 6/2006 |
| JP | 2006-206047 | 8/2006 |
| JP | 2006-316803 | 11/2006 |
| JP | 2006-336576 | 12/2006 |
| JP | 2006-336757 | 12/2006 |
| JP | 2006-336759 | 12/2006 |
| JP | 2006-336760 | 12/2006 |
| JP | 2006-336761 | 12/2006 |
| JP | 2007-107573 | 4/2007 |
| WO | 02/078979 A1 | 10/2002 |

OTHER PUBLICATIONS

Japanese Office Action issued Nov. 4, 2009 in corresponding Japanese Patent Application 2005-162383.

Japanese Office Action issued Nov. 4, 2009 in corresponding Japanese Patent Application 2005-162384.

Japanese Office Action issued Nov. 4, 2009 in corresponding Japanese Patent Application 2005-162385.

I U.S. Office Action mailed Mar. 8, 2010 in related U.S. Appl. No. 11/663,850.

Japanese Office Action issued Mar. 9, 2010 in corresponding Japanese Patent Application 2005-162380.

Japanese Office Action issued Mar. 9, 2010 in corresponding Japanese Patent Application 2005-162383.

Japanese Office Action issued Mar. 9, 2010 in corresponding Japanese Patent Application 2005-162384.

Japanese Office Action issued Mar. 9, 2010 in corresponding Japanese Patent Application 2005-162385.

U.S. Office Action mailed Apr. 22, 2010 and issued in related U.S. Appl. No. 11/444,343.

Patent abstract of Japan, Japanese Publication No. 2001-001710, Published Jan. 9, 2001.

Patent abstract of Japan, Japanese Publication No. 2002-283804, Published Oct. 3, 2002.

Patent abstract of Japan, Japanese Publication No. 2002-295505, Published Oct. 9, 2002.

Patent abstract of Japan, Japanese Publication No. 2001-018604, Published Jan. 23, 2001.

European Search Report dated May 20, 2011 in corresponding European Patent Application 08702765.2.

Japanese Office Action issued Jun. 1, 2010 in corresponding Japanese Patent Application 2005-205184.

U.S. Office Action mailed Jun. 29, 2010 in related U.S. Appl. No. 11/663,850.

Chinese Office Action issued Jul. 14, 2010 in related Chinese Patent Application 200880002237.6.

Japanese Office Action issued Jul. 6, 2010 in related Japanese Patent Application 2004-354798.

Japanese Office Action issued Jul. 27, 2010 in related Japanese Patent Application 2005-162379.

English Translation of the International Preliminary Report on Patentability mailed Jul. 30, 2009, issued in corresponding International Patent Application PCT/JP2008/000024.

U.S. Notice of Allowance mailed Aug. 23, 2010 in related U.S. Appl. No. 11/444,343.

Japanese Office Action issued Sep. 7, 2010 in corresponding Japanese Patent Application 2005-162381.

U.S. Notice of Allowance mailed Sep. 22, 2010 in related U.S. Appl. No. 11/663,850.

Japanese Office Action issued Oct. 12, 2010 in corresponding Japanese Patent Application 2004-295673.

Japanese Office Action issued Nov. 2, 2010 in corresponding Japanese Patent Application 2005-162379.

Japanese Office Action issued Nov. 9, 2010 in corresponding Japanese Patent Application 2004-354798.

Japanese Office Action dated Nov. 17, 2009 and issued in corresponding Japanese Patent Application 2005-205185.

Japanese Office Action dated Nov. 17, 2009 and issued in corresponding Japanese Patent Application 2005-208185.

Japanese Office Action dated Nov. 17, 2009 and issued in corresponding Japanese Patent Application 2005-208186.

Japanese Notification of Reason(s) for Rejection dated May 18, 2010, issued in a related Japanese Application No. 2004-295673.

Japanese Notification of Reason(s) for Rejection issued Dec. 27, 2011 in corresponding Japanese Patent Application No. 2006-004978.

Japanese Notification of Reason(s) for Rejection issued Dec. 27, 2011 in corresponding Japanese Patent Application No. 2006-010702.

Japanese Notification of Reason(s) for Rejection issued Dec. 27, 2011 in corresponding Japanese Patent Application No. 2006-021042.

US Office Action mailed Sep. 1, 2011 in corresponding U.S. Appl. No. 12/086,000.

Chinese Office Action dated Feb. 2, 2012 issued in corresponding Chinese Patent Application No. 200880002237.6.

U.S. Appl. No. 11/663,850, filed Mar. 27, 2007, Masahiro Kiuchi et al., NTN Corporation.

U.S. Appl. No. 11/444,343, filed Jun. 1, 2006, Kazuo Komori et al., NTN Corporation.

International Search Report of International Published Application No. PCT/JP2005/016738 (mailed Dec. 20, 2005).

International Preliminary Report on Patentability mailed Apr. 11, 2007 and issued in corresponding International Patent Application No. PCT/JP2005/016738.

European Search Report, mailed on Aug. 2, 2006, for corresponding European Patent Application.

International Search Report for International Application No. PCT/JP2008/000024, mailed Feb. 12, 2008.

U.S. Office Action dated Feb. 29, 2012 issued in copending U.S. Appl. No. 12/086,000.

Japanese Notification of Reason(s) for Rejection dated Mar. 27, 2012 issued in corresponding Japanese Patent Application No. 2007-008075.

European Office Action dated May 3, 2012 issued in corresponding European Patent Application No. 08702765.2.

Chinese Office Action dated May 29, 2012 issued in corresponding Chinese Patent Application No. 200880002237.6.

METHOD OF MAKING WHEEL SUPPORT BEARING

CROSS REFERENCE TO THE RELATED PATENT APPLICATIONS

This application claims the benefit under 35 U.S.C. Section 371, of International Application PCT/JP 2008/000024 filed Jan. 15, 2008, which claimed priority to Japanese Application 2007-008075 filed Jan. 17, 2007, in the Japanese Patent Office, the disclosures of all of which are hereby incorporated by reference.

BACKGROUND OF THE INVENTION

1. Field of the Invention

The present invention relates to a wheel support bearing assembly for rotatably supporting a wheel of, for example, an automotive vehicle and a method of manufacturing such wheel support bearing assembly.

2. Description of the Prior Art

Such a wheel support bearing assembly as shown in FIG. 10 has hitherto been suggested, which is used for rotatably supporting a vehicle drive wheel. See, for example, the Patent Document 1 listed below. The wheel support bearing assembly shown in FIG. 10 includes an outer member 21, an inner member 22 and double rows of rolling elements 25 rollingly interposed between opposed raceway surfaces 23 and 24 defined respectively in the outer member 21 and the inner member 22. The inner member 22 referred to above is made up of a hub unit 29, having a wheel mounting hub flange 29a defined in an outer periphery of the hub unit 29, and an inner ring 30 mounted on an inboard end portion of the outer periphery of the hub unit 29. The hub unit 29 has a center bore 31 defined therein in alignment with the longitudinal axis thereof, and a stem portion 33a of an outer ring 33, forming a part of a constant velocity universal joint, is inserted into the center bore 31 for spline engagement with the hub unit 29, with an annular stepped face 33b of the constant velocity universal joint outer ring 33 then urged against an inboard end face 30a of the inner ring 30. Starting from this condition, when a nut 34, which is threadedly mounted on a free end of the stem portion 33a, is fastened, the inner member 22 can be clamped between the constant velocity universal joint outer ring 33 and the nut 34.

According to the Patent Document 1 referred to above, the inner ring 30 is mounted externally on an inner ring mounting area 35 of a stepped configuration defined in the inboard end portion of the outer periphery of the hub unit 29 so as to be recessed radially inwardly of the hub unit 29; a stepped area 36 is formed in an inboard end of an inner periphery of the inner ring 30; and an inboard extremity 29ba of the hub unit 29 is radially outwardly deformed to form a crimped portion 29b that is then seated within the stepped area 36 in the inner ring 30. In this way, an undesirable separation of the inner ring 30, which would otherwise occur under the influence of an external force generated during assemblage onto the automotive vehicle, is avoided effectively.

[Patent Document 1] JP Laid-open Patent Publication No. H09-164803

It has, however, been found that the wheel support bearing assembly of the structure described hereinabove has the following problems:

(1) Because the crimped portion 29b of the hub unit 29 is large in size, the radial step, which defines the stepped area 36 in the inboard end portion of the inner ring 30 as shown in FIG. 11 showing a portion of FIG. 10 on an enlarged scale, is required to have 5 to 7 mm in terms of the difference in radius. Since the radial step of the stepped area 36 is increased in this way, the surface area of the inboard end face 30a of the inner ring 30 decreases, resulting in increase of the contact surface pressure between it and the annular stepped face 33b of the constant velocity universal joint outer ring 33. This in turn constitutes a cause of generation of frictional wear and/or abnormal noises.

(2) If an attempt is made to allow the crimped portion 29b of the hub unit 29 to be accommodated axially inwardly (on an outboard side) of the inboard extremity of the inner ring 30, the stepped area 36 in the inner ring 30 is required to have about 7 to 8 mm in axial length as shown in FIG. 11. Since the axial length of the stepped area 36 increases as discussed above, the inner ring stepped area 36 tends to occupy a position on the line of extension L of the rolling element contact angle θ and a considerable inner ring deformation will occur during the operation under the influence of a load to such an extent as to possibly result in reduction of the longevity. Also, increase of the axial length of the inner ring stepped area 36 results in reduction of the length (surface area) of mounting of the inner ring 30 relative to the hub unit 29 and, accordingly, an inner ring creep may occur, possibly accompanied by reduction in longevity. Those problems may be alleviated if the widthwise (or axial) dimension of the inner ring 30 as a whole is increased, but the increase of the widthwise dimension requires an extra space in a widthwise (or axial) direction.

(3) Also, because the crimped portion 29b of the hub unit 29 is large in size, the crimping punch tends to interfere with the inner ring 30 during the orbital forging to form the crimped portion 29b, resulting in difficulty in processing.

In order to alleviate the foregoing problems, an attempt has been made to design the stepped area 36 of the inner ring 30 to be shallow enough to be of a depth corresponding to an inner peripheral edge of the inner ring end face 30a as shown in FIG. 12. Even though the stepped area 36 is so designed as to be shallow as discussed above, it has been found that a sufficient proof strength against a separating or pull-out force acting during mounting of the bearing assembly onto the automotive vehicle can be secured. If the crimped portion 29b is employed against the stepped area 36 of such a small size, crimping can be accomplished without relying on the orbital forging. By way of example, the method can be employed, in which as shown in FIG. 13, a bearing assembly is fixed with its inboard side oriented upwardly and, while the bearing assembly is in this condition, a crimping punch 19 of a type having a forefront end outer peripheral surface representing a tapered surface is urged from above into an inner periphery of the inboard end of the hub unit 29 so that the crimped portion 29b of the hub unit 29 can be diametrically expanded over the entire circumference thereof.

With the structure, in which the inboard end portion of the hub unit 29 is crimped to avoid detachment of the inner ring 30 as shown in FIG. 12, the proof strength against the possible separation of the inner ring 30 depends on the amount of augmentation D of the crimped portion 29 in a radially outward direction. In the case of the crimped portion 29b relative to the stepped area 36 of the kind discussed above, the sufficient proof strength against the inner ring separation can be obtained if the amount of augmentation D referred to above, which is normally smaller than the depth of the stepped area 36, is of a value equal to or higher than a predetermined value determined based on the strength calculation and/or the strength test. However, since the stepped area 36, with which the crimped portion 29b is engaged, is shallow, there is the possibility that the proof strength against the inner ring separation would be insufficient if the amount of augmentation D is of a value lower than the predetermined value. Conversely, if the amount of augmentation D is too large, excessive loads will act on various portions of the hub unit 29, except for the crimped portion 29b, and also various portions of the inner ring 30. In view of this, it is desired that the crimping process to form the crimped portion 29b should be carried out in such a way that the amount of augmentation D can be accommodated within a tolerance over the predetermined value referred to above. However, with the crimping process using the crimping punch 19 of the kind discussed above, there is a problem that since the crimped portion 29b cannot be viewed from outside during the processing, it is difficult to ensure the amount of augmentation D that is desired or required.

SUMMARY OF THE INVENTION

An object of the present invention is to provide a wheel support bearing assembly and a method of manufacturing such bearing assembly, in which the separation of the inner ring during the assemblage onto the automotive vehicle can be avoided without the bearing functionality being affected adversely and in which the crimped portion of the hub unit designed to avoid the separation of the inner ring can have an amount of radially outward augmentation enough to ensure the required proof strength against the inner ring separation.

A wheel support bearing assembly according to the present invention includes an outer member having an inner periphery formed with a plurality of rows of raceway surfaces defined therein, an inner member having an outer periphery formed with raceway surfaces opposed to the raceway surfaces referred to previously, and a plurality of rows of rolling elements interposed between those opposed raceway surfaces, in which the inner member is made up of an hub unit, which has a wheel mounting flange formed on an outer periphery thereof and which also has a center bore defined in a center portion thereof, and an inner ring mounted on an inner ring mounting area of a stepped configuration defined in an inboard side of an outer periphery of the hub unit, with the rows of the raceway surfaces defined in the hub unit and the inner ring, respectively.

The wheel support bearing assembly according to a first aspect of the present invention is such that in the wheel support bearing assembly of the kind described above, an inboard end portion of the inner ring has an inner peripheral edge provided with an annular stepped area; the hub unit has an inboard end portion provided with a crimped portion engageable with an axially oriented inclined face of the stepped area of the inner ring; and the crimped portion is a plastically deformable portion in the inboard end portion of the hub unit, which deformable portion is of a cylindrical shape prior to a crimping process, but which deformable portion has been crimped to assume a diametrically expanded state by means of a crimping punch driven into an inner periphery of the plastically deformable portion from an inboard side thereof, the amount of radially outward augmentation of the crimped portion being regulated by setting the amount of change in an inner diameter of an inboard end of the plastically deformable portion, which is brought about by the crimping punch being driven in, to a value within a preset range.

According to the first aspect of the present invention, since the inboard end portion of the inner ring has its inner peripheral edge provided with the annular stepped area and the crimped portion resulting from the crimping of the hub unit is engaged with the axially oriented inclined face of this stepped area, an undesirable separation of the inner ring from the hub unit by the effect of an external force generated during the assemblage onto the automotive vehicle can be avoided. Since the stepped area referred to above is so formed as to occupy a limited region of the inner periphery of the inner ring, the stepped area can be minimized in size while the proof strength against the separation of the inner ring is secured. For this reason, even though the stepped area is employed, reduction in surface area of the end face of the inner ring can be minimized, and also an undesirable increase of the contact surface pressure between it and the step face of the constant velocity universal joint outer ring can be suppressed to avoid generation of frictional wear and/or abnormal noises resulting from occurrence of an inner ring creepage or the like, thus suppressing any reduction in longevity of the bearing assembly.

Also, since the crimped portion is formed by crimping a plastically deformable portion of the inboard end portion of the hub unit, which is of a cylindrical shape prior to a crimping process, in a diametrically expanded state with the use of a crimping punch driven into the inner periphery of the plastically deformable portion from an inboard side thereof, the crimping process can be accomplished easily.

It has been ascertained as a result of a series of experiments that when the cylindrical plastically deformable portion of the hub unit is crimped with the use of the crimping punch, such a correlation as shown in FIG. 8 exists between the amount of inner diameter change ($\phi C - \phi A$) (See FIGS. 3A and 3B.) of the inboard end of the plastically deformable portion and the amount of radially outward augmentation D (See FIG. 3B.). In view of this, when at the time the crimping punch is to be driven in, the amount of change in the inner diameter of the inboard end of the plastically deformable portion is set to a value within the preset range, the amount of radially outward augmentation of the crimped portion can be set to a proper value, thereby ensuring the required proof strength against the inner ring separation.

A method of manufacturing the wheel support bearing assembly according to the first aspect of the present invention is such that while the crimped portion represents a cylindrical plastically deformable portion prior to the crimping process, the crimped portion is formed by driving a crimping punch into the inner periphery of the cylindrical plastically deformable portion from an inboard side thereof so as to allow it to assume a diametrically expanded state, and at the time the crimping punch is driven in, the amount of change of an inner diameter of the inboard end of the plastically deformable portion is set to a value within a preset range to thereby regulate the amount of radially outward augmentation of the crimped portion.

According to this manufacturing method, the crimped portion can be easily processed since the plastically deformable portion of the inboard end portion of the hub unit is crimped to assume the diametrically expanded state with the crimping punch driven into the inner periphery thereof from the inboard side. Since at the time the crimping punch is driven in, the amount of change of an inner diameter of the inboard end of the plastically deformable portion is set to a value within a preset range, the amount of radially outward augmentation of the crimped portion can be set to a proper value, allowing the required proof strength against the inner ring separation to be ensured.

Also, a wheel support bearing assembly according to the second aspect of the present invention is such that in the wheel support bearing assembly of the structure according to the first aspect of the present invention described hereinabove, instead of the amount of change in the inner diameter of the inboard end of the plastically deformable portion set to a value within the preset range, the maximum inner diameter of the tapered inner peripheral surface of the plastically deformable portion, which has been induced as a result of the crimping punch, of which crimping punch a forefront outer peripheral surface is tapered to provide a tapered surface, being driven in from the inboard side, is set to a value within a predetermined range, so that the amount of radially outward augmentation of the crimped portion can be regulated.

According to the second aspect of the present invention, since in a manner similar to that in the wheel support bearing assembly according to the previously described first aspect of the present invention, the stepped area is provided in the inner peripheral surface of the inner ring and the crimped portion resulting from the crimping of the hub unit is engaged inside the stepped area, an undesirable separation of the inner ring from the hub unit by the effect of the external force generated during the assemblage onto the automotive vehicle can be avoided. Since the stepped area referred to above is so formed as to occupy a limited region of the inner peripheral edge of the inner ring, the stepped area can be minimized in size while the proof strength against the separation of the inner ring is secured. For this reason, even though the stepped area is employed, reduction in surface area of the end face of the inner ring can be minimized, and also an undesirable increase of the contact surface pressure between it and the step face of the constant velocity universal joint can be suppressed to avoid generation of frictional wear and/or abnormal noises resulting from, for example, occurrence of an inner ring creepage, thus suppressing any reduction in longevity of the bearing assembly.

Also, since the crimped portion is formed by crimping a plastically deformable portion of the inboard end portion of the hub unit, which is of a cylindrical shape prior to a crimping process, in a diametrically expanded state with the use of a crimping punch having the tapered forefront outer peripheral surface driven into an inner periphery of the plastically deformable portion from the inboard side, the crimping process can be accomplished easily.

As a result of a series of experiments, it has been ascertained that when the cylindrical plastically deformable portion of the hub axis is crimped with the use of the crimping punch having the tapered forefront outer peripheral surface to represent the tapered surface, such a correlation as shown in FIG. 9 exists between the maximum inner diameter $\phi C$ of the tapered inner peripheral surface of the plastically deformable portion (See FIG. 3B.) and the amount of radially outward augmentation D (See FIG. 3B.). In view of this, when at the time the crimping punch is to be driven in, the maximum inner diameter of the tapered inner peripheral surface of the plastically deformable portion is set to a value within the predetermined range, the amount of radially outward augmentation of the crimped portion can be set to a proper value, thereby ensuring the required proof strength against the inner ring separation.

A method of manufacturing the wheel support bearing assembly of the structure according to the second aspect of the present invention is such that the crimped portion is a plastically deformable portion of the inboard end portion of the hub unit, which is of a cylindrical shape prior to a crimping process, but which has been crimped to assume a diametrically expanded state by driving the crimping punch, which has its forefront outer peripheral surface tapered to represent a tapered surface, into an inner periphery of the cylindrical plastically deformable portion from the inboard side and, at the time the crimping punch is driven in, the maximum inner diameter of the tapered inner peripheral surface of the plastically deformable portion to a value within a predetermined range to thereby regulate the amount of radially outward augmentation of the crimped portion.

According to this manufacturing method, when the plastically deformable portion of the inboard end portion of the hub unit is crimped to assume the diametrically expanded state by driving the crimping punch with the tapered forefront outer peripheral surface to represent the tapered surface, into the inner periphery thereof from the inboard side, the crimped portion can be easily processed. Since at the time the crimping punch is driven in, the maximum inner diameter of the tapered inner peripheral surface of the plastically deformable portion is set to a value within a predetermined range, the amount of radially outward augmentation of the crimped portion can be set to a proper value and, accordingly, the required proof strength against the inner ring separation can be ensured.

In the wheel support bearing assembly according to any one of the first and second aspects of the present invention, an inboard portion of the hub unit preferably has an inner peripheral surface formed with a large diameter stepped portion that is radially outwardly depressed and the crimped portion is preferably formed in an inboard end portion of the large diameter stepped portion in the hub unit. According to this feature, the radial wall thickness of the plastically deformable portion that is eventually crimped is reduced, thus facilitating the crimping process.

In the wheel support bearing assembly according to any one of the first and second aspects of the present invention, an inner surface of the stepped area in the inner ring preferably has a straight portion continued to an inboard side of the inclined face and a radial gap is present between the straight portion and the crimped portion. This is particularly advantageous in that since the crimping portion does not contact the inner diametric straight portion of the inner ring stepped area, no excessive load will act on the various portions of the hub unit, except for the crimped portion, and the various portions of the inner ring.

In the wheel support bearing assembly according to any one of the first and second aspects of the present invention, the amount of augmentation is of a small value such as within the range of 0.05 to 0.25 mm.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIGS. 3A and 3B are longitudinal sectional views on an enlarged scale showing a hub unit crimped portion and an inner ring stepped area and their peripheral portions, in which FIG. 3A illustrates a condition before a crimping process and FIG. 3B illustrates a condition after the crimping process;

DESCRIPTION OF THE PREFERRED EMBODIMENTS

Figure 1:
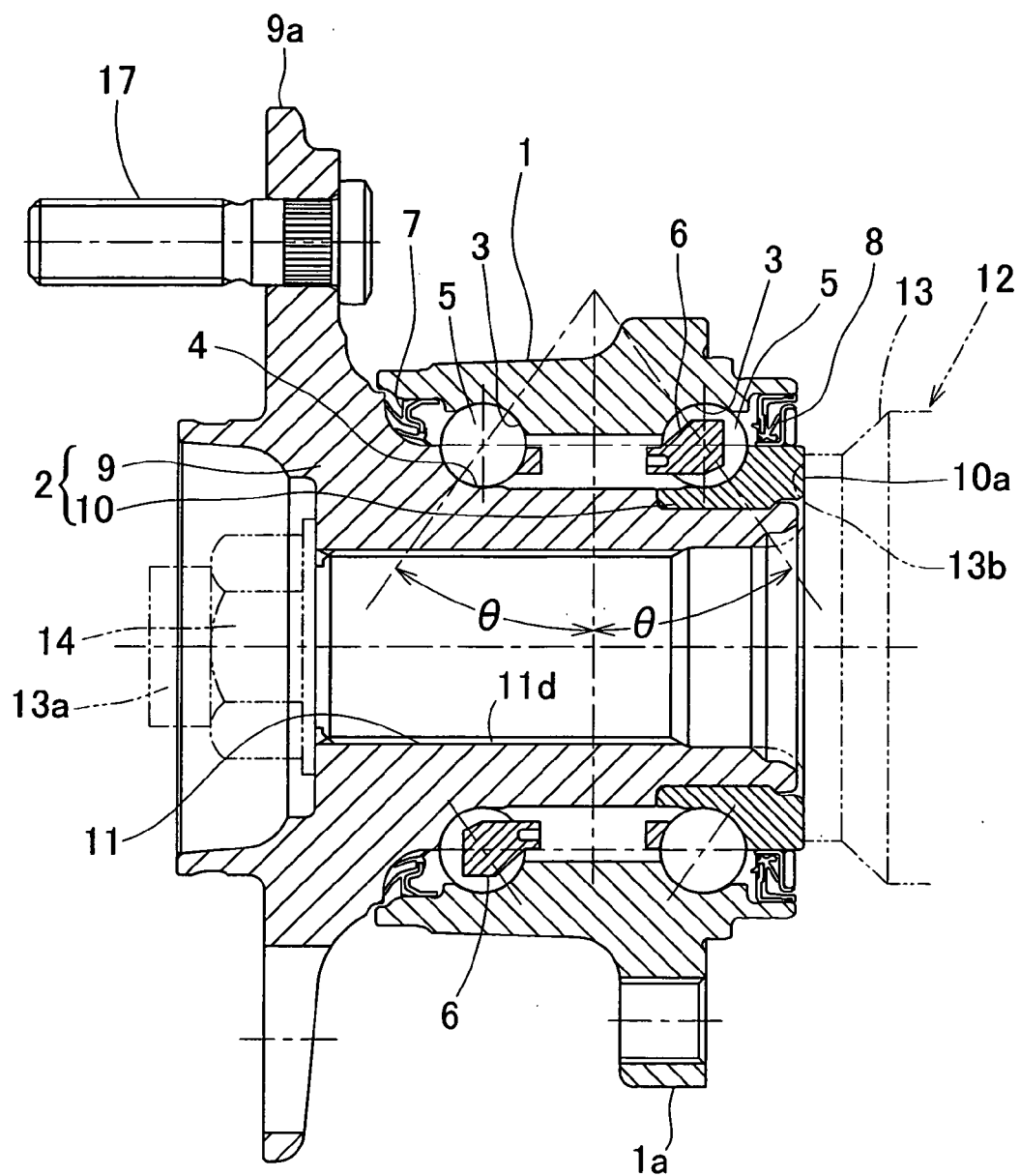
FIG. 1 is a longitudinal sectional view showing a wheel support bearing assembly according to a preferred embodiment of the present invention.

A preferred embodiment of the present invention will now be described with particular reference to FIGS. 1 to 3B. This embodiment is applied to a wheel support bearing assembly of an inner ring rotating model, which is of a third generation type for the support of a drive wheel of a vehicle such as, for example, an automotive vehicle. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

The wheel support bearing assembly includes an outer member 1 having an inner periphery formed with a plurality of rows of raceway surfaces 3 defined therein, an inner member 2 having an outer periphery formed with raceway surfaces 4 opposed to the raceway surfaces 3 referred to previously, and a plurality of rows of rolling elements 5 interposed between those opposed raceway surfaces 3 and 4. The wheel support bearing assembly in this embodiment is of a double-row back-to-back angular contact ball bearing type, and each row of the rolling elements 5 are retained by a corresponding retainer 6. The raceway surfaces 3 and 4 have an arcuately sectioned shape and are so formed as to have contact angles θ of the rolling elements held in back-to-back relation with each other. A bearing space delimited between the outer member 1 and the inner member 2 has its opposite annular open ends sealed by respective sealing devices 7 and 8.

The outer member 1 is the one that serves as a stationary member and is of one-piece construction in its entirety including a vehicle body fitting flange 1a adapted to be fitted to a knuckle of a suspension system (not shown) on a vehicle body structure.

The inner member 2 is the one that serves as a rotatable member and is made up of a hub unit 9 having a hub flange 9a defined in an outer periphery thereof for the support of a vehicle wheel, and an inner ring 10 mounted on an inboard end portion of the hub unit 9. The rows of the rolling surfaces 4 referred to previously are formed respectively in the hub unit 9 and the inner ring 10. The hub unit 9 has a center bore 11 defined in a center portion thereof so as to extend completely through the length of the hub unit 9. The raceway surface 4 in the hub unit 9 is rendered to be a surface hardened surface formed by means of a hardening treatment. The inner ring 10 is hardened in its entirety from surface to core thereof by means of a hardening treatment.

Figure 2:
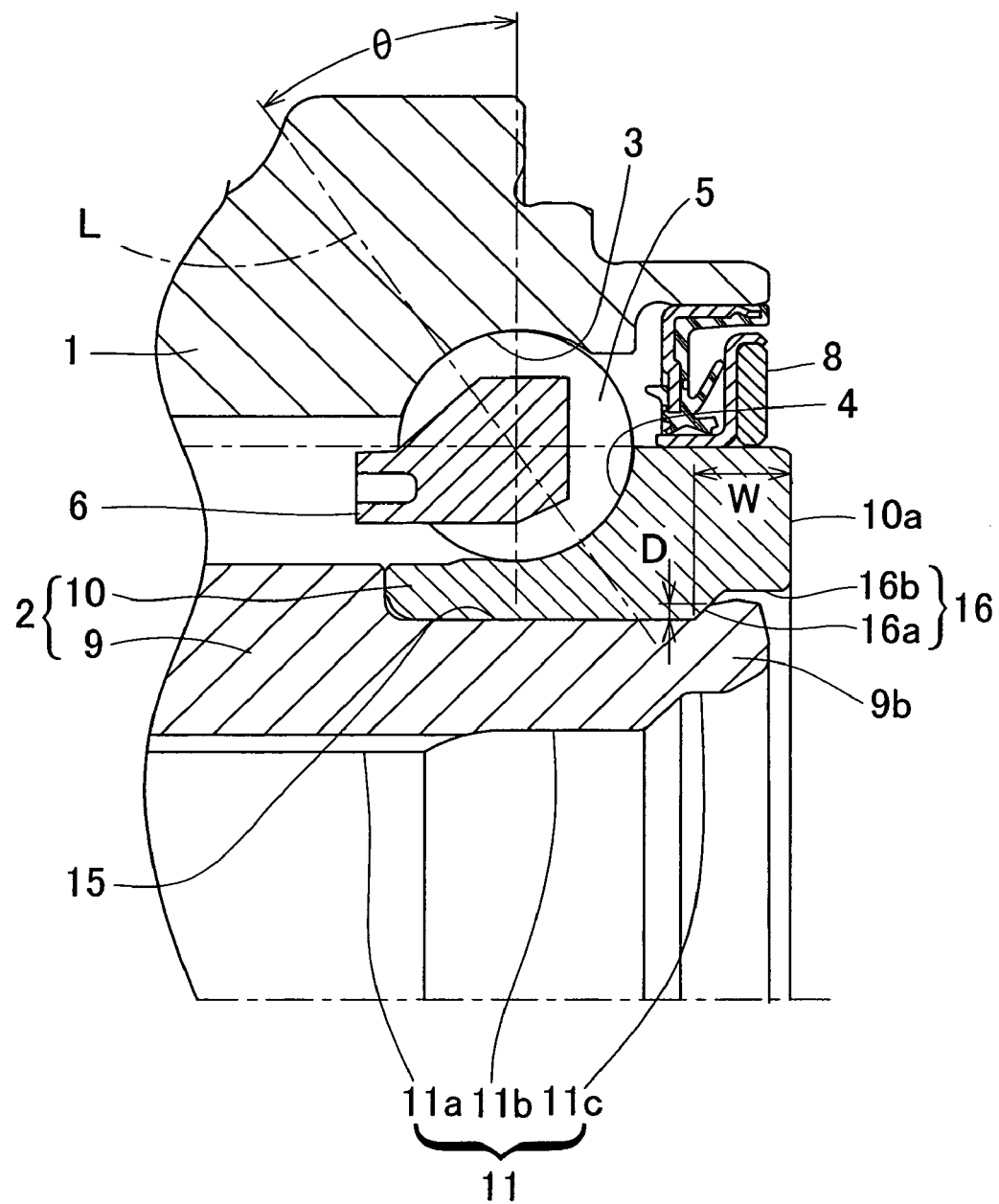
FIG. 2 is a longitudinal sectional view on an enlarged scale, showing an important portion of the wheel support bearing assembly.

As shown in a fragmentary sectional view in FIG. 2, the center bore 11 of the hub unit 9 is of a double stepped configuration including a general diameter bore portion 11a occupying a portion thereof adjacent an outboard end to a portion thereof in the vicinity of an inboard end, an intermediate diameter stepped bore portion 11b defined on an inboard side of the general diameter bore portion 11a and having a diameter larger than that of the general diameter bore portion 11a, and a large diameter stepped bore portion 11c defined on a further inboard side of the intermediate stepped bore portion 11b so as to be radially inwardly recessed and having a diameter larger than that of the intermediate stepped bore portion 11b. The general diameter bore portion 11a has an inner peripheral surface formed with spline grooves 11d engageable with spline projections formed on an outer periphery of a stem portion 13a of a constant velocity universal joint 12 shown in FIG. 1.

Figure 3A:
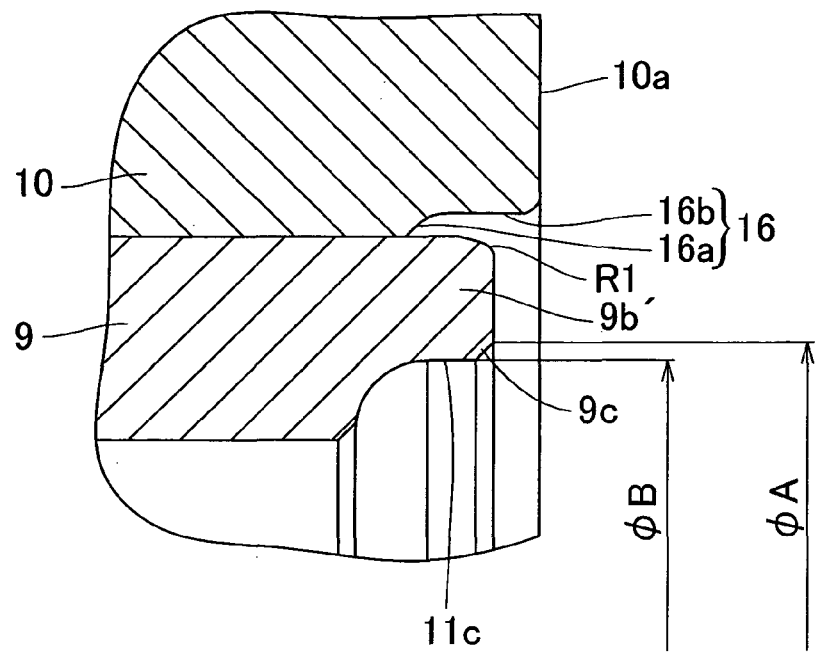

The inboard end portion of the outer periphery of the hub unit 9 best shown in FIG. 2 is formed with an inner ring mounting area 15 of a stepped configuration having a diameter smaller than that of the remaining portions of the outer periphery of the hub unit 9, and the inner ring 10 is mounted on this inner ring mounting area 15. An inboard end of the inner ring 10 has an inner periphery provided with an annular stepped area 16. That is to say, the inner ring 10 has an inner peripheral surface provided with the stepped area 16 continued to an inboard end face 10a of the inner ring 10 and having a small step depth comparable to an inner peripheral edge of the end face 10a. An inner surface of this stepped area 16, that is, an outboard inner end face is made up of an axially oriented inclined face 16a, which is continued to an inner peripheral surface of the inner ring 10 at a location on the outboard side and is radially outwardly depressed as it comes on the inboard side with a tapered diameter increasing to the above described depth, and a straight portion 16b, which is an inner diametric surface in the form of a cylindrical surface at the previously described depth and continued inboardly from the inclined face 16a to the inboard end of the inner ring 10. The inclined face 16a may be in the form of a tapered face, a curved face or a combination of such a tapered face and a curved face continued towards a radially outward side as shown in FIG. 3A. The axial range W of the stepped area 16 best shown in FIG. 2 lies on the inboard side of the line of extension of a straight line L forming the rolling element contact angle θ of the inner ring raceway surface 4.

Figure 6:
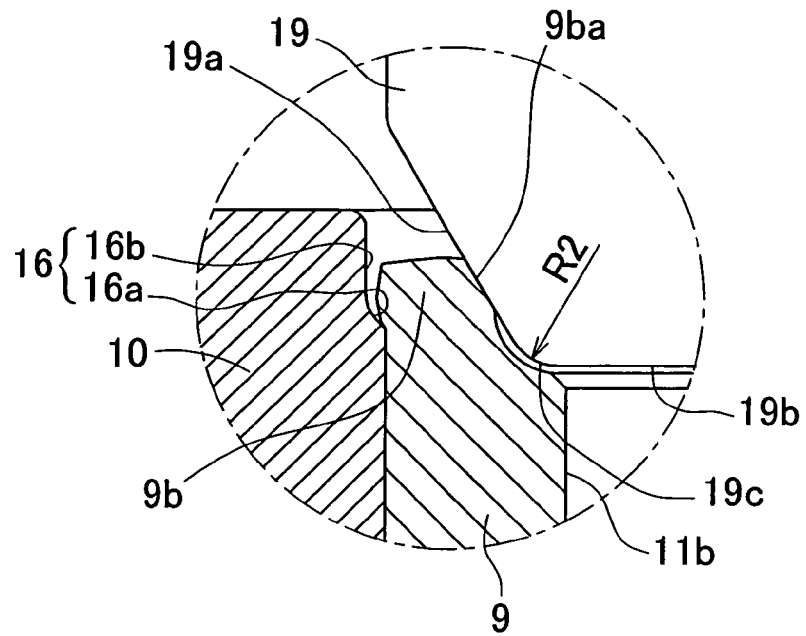
FIG. 6 is a longitudinal sectional view showing a portion of FIG. 5 indicated by the phantom circle X in FIG. 5.
Figure 7:
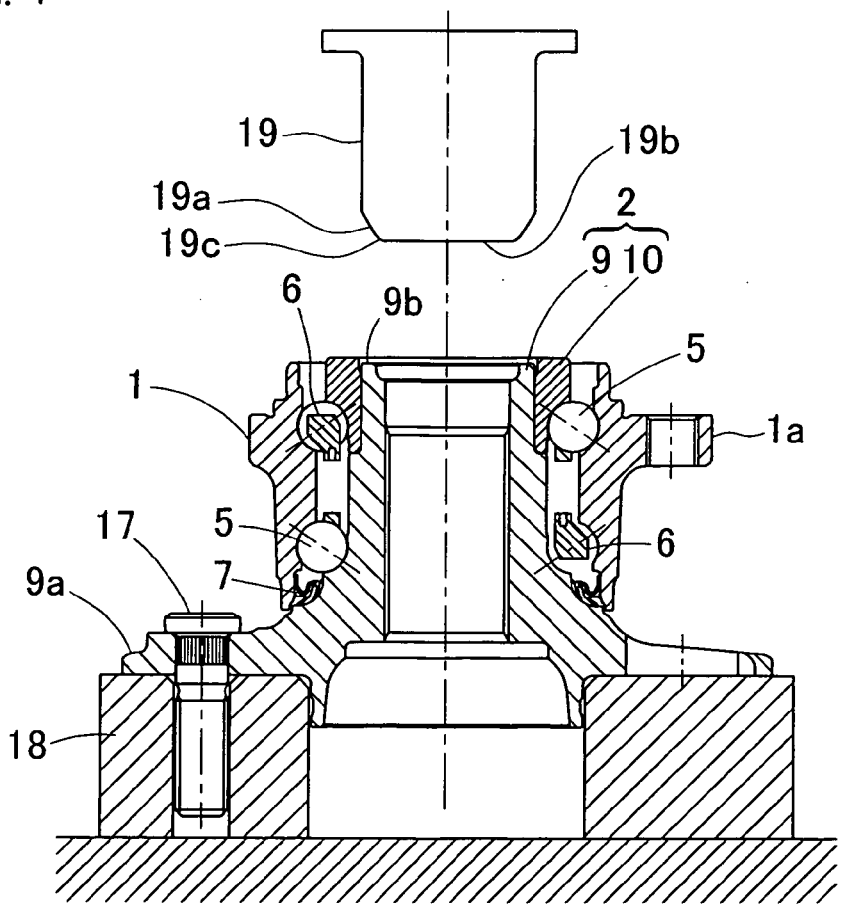
FIG. 7 is a longitudinal sectional view showing the condition of the wheel support bearing assembly, in which the crimping process is completed.

On the other hand, the inboard end portion of the hub unit 9 is rendered to be a crimped portion 9b which is diametrically expanded by a plastic deformation accomplished by a crimping process. More specifically, this crimped portion 9b is the inboard end portion of the hub unit 9, which has been crimped in a diametrically expanded condition by pressing axially a crimping punch 19, best shown in FIG. 4, into an inner periphery of the inboard end of the hub unit 9. The punch 19 has a forefront outer peripheral surface representing a tapered surface 19*a* and also has a forefront corner 19C delimited between the tapered surface 19*a* and a forefront surface 19*b* and chamfered as at R2 (shown in FIG. 6). The inner peripheral surface of the crimped portion 9*b* is rendered to be a non-heat-treated portion so that the crimping process can be easily accomplished. The inner peripheral surface of the crimped portion 9*b* shown in FIG. 3B is the large diameter stepped bore portion 11*c* of the center bore 11.

Figure 3B:
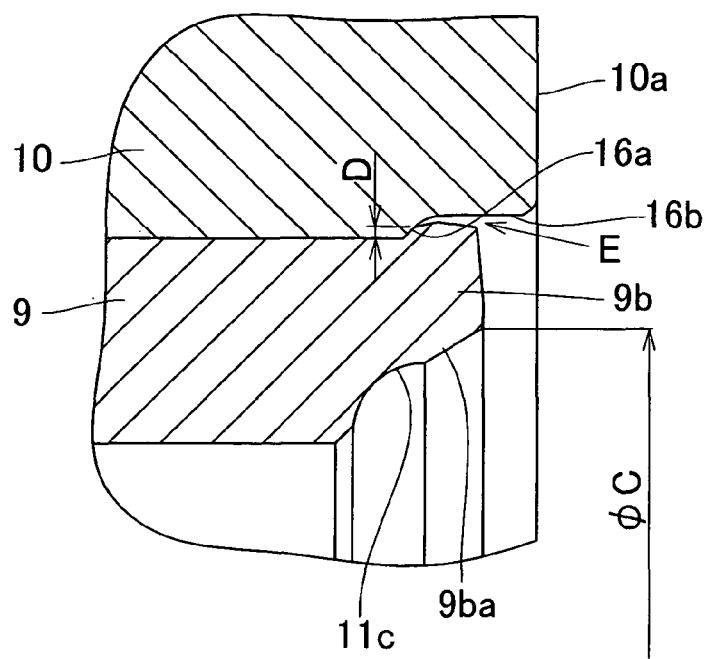

The crimped portion 9*b* represents a substantially cylindrical shape, as best shown in FIG. 3A, before the crimping process is applied thereto to form the crimped portion 9*b*, but is diametrically expanded, as best shown in FIG. 3B, by means of a plastic deformation after the crimping process has been applied. More specifically, a plastically deformable portion 9*b'* before the crimping process is formed with a chamfered area 9*c* (the diameter of a large diameter end being expressed by $\phi A$ and the diameter of a reduced diameter end being expressed by $\phi B$) at an inner periphery of the inboard end. The outer periphery of the inboard end is formed to have a curved surface R1 of an arcuate sectional shape. The crimped portion 9*b*, which has been deformed by the diametric expansion as shown in FIG. 3B, is engaged with the inclined face 16*a* of the stepped area 16 to thereby regulate a movement of the inner ring 10 towards the inboard side. Also, the crimped portion 9*b* after the crimping process is so designed as to have a radial gap E left between an outer peripheral portion of the crimped portion 9*b* and the stepped area 16 without contacting the straight portion 16*b*, which is the inner diametric surface of the stepped area 16, and does not protrude towards the inboard side beyond the inboard end face 10*a* of the inner ring 10. It is to be noted that the inner peripheral surface of the crimped portion 9*b* after the crimping process comes to represent a tapered inner peripheral surface 9*ba* having an end portion thereof opening as a result of deformation of the large diameter stepped bore portion 11*c*.

A crimping method to form the crimped portion 9*b* of the kind discussed hereinabove will now be described with particular reference to FIGS. 4 to 7.

Figure 4:
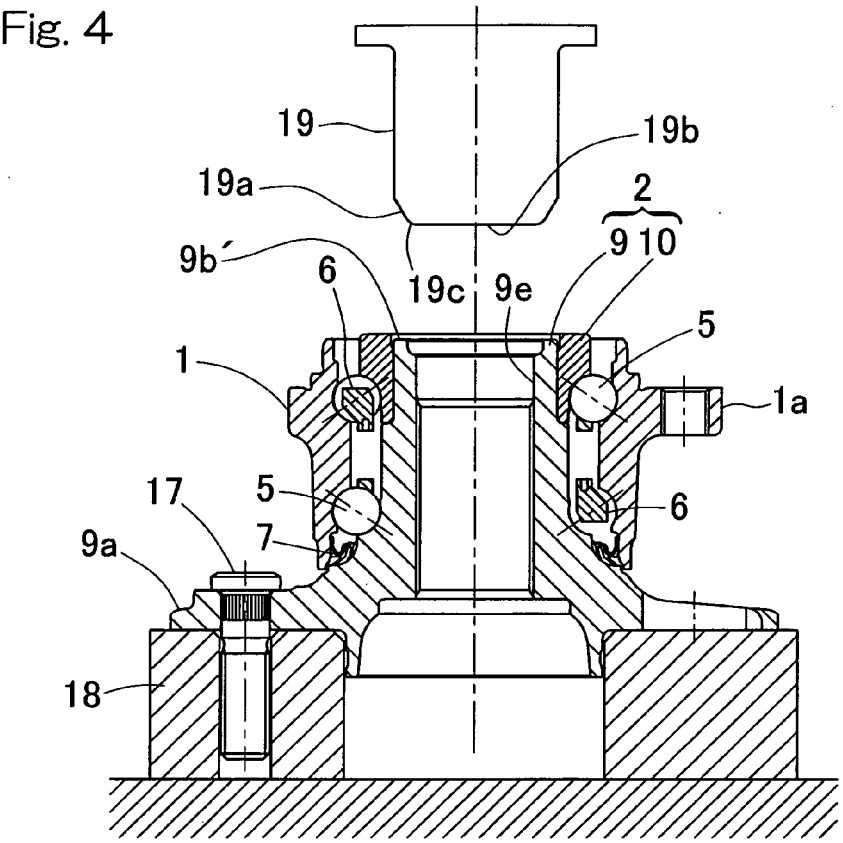
FIG. 4 is a longitudinal sectional view showing a process step preceding the crimping process in the wheel support bearing assembly.
Figure 5:
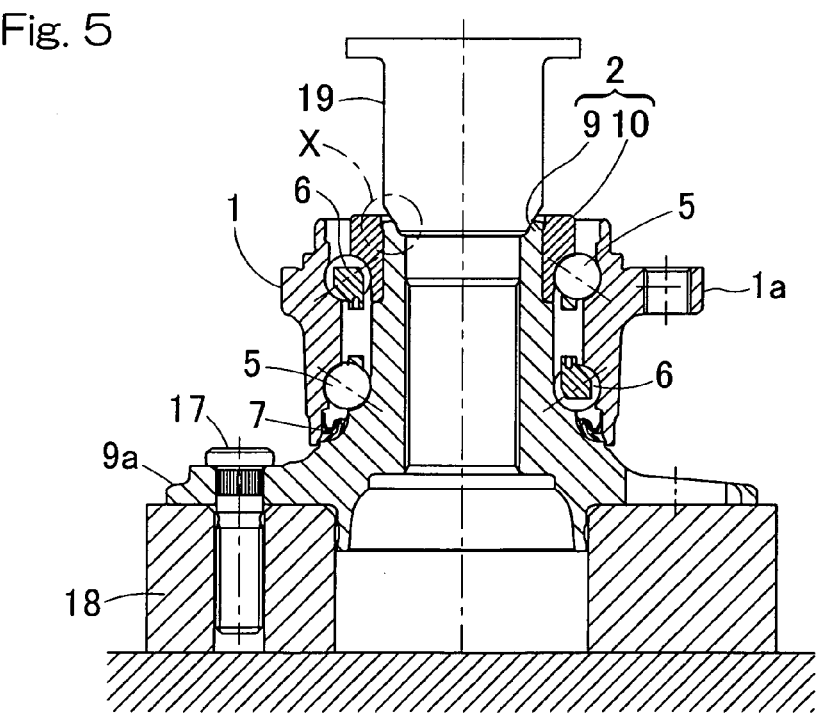
FIG. 5 is a longitudinal sectional view showing a crimping stage in the crimping process in the wheel support bearing assembly.

In the practice of this crimping process, the bearing assembly is first placed on a support table 18 in a posture with the inboard side thereof oriented upwards as shown in FIG. 4. In this fixed condition, as shown in FIG. 5, the crimping punch 19 is lowered towards the inboard end of the hub unit 9 until the forefront, which represents the tapered surface 19*a*, is driven into the inner periphery of the plastically deformable portion 9*b'* to thereby apply a press work to the entire circumference of the plastically deformable portion 9*b'*, thus completing the crimped portion 9*b*. The inner ring 10 has its outer peripheral surface held in a non-constrained condition with the crimping punch 19 pressed thereinto. At this time, by controlling the crimping operation, the amount of radially outward augmentation D (FIGS. 2 and 3B) of the crimped portion 9*b* is rendered to be of a value effective to assure the required proof strength against the inner ring separation. As a method of controlling the crimping operation, the following two can be contemplated.

Figure 8:
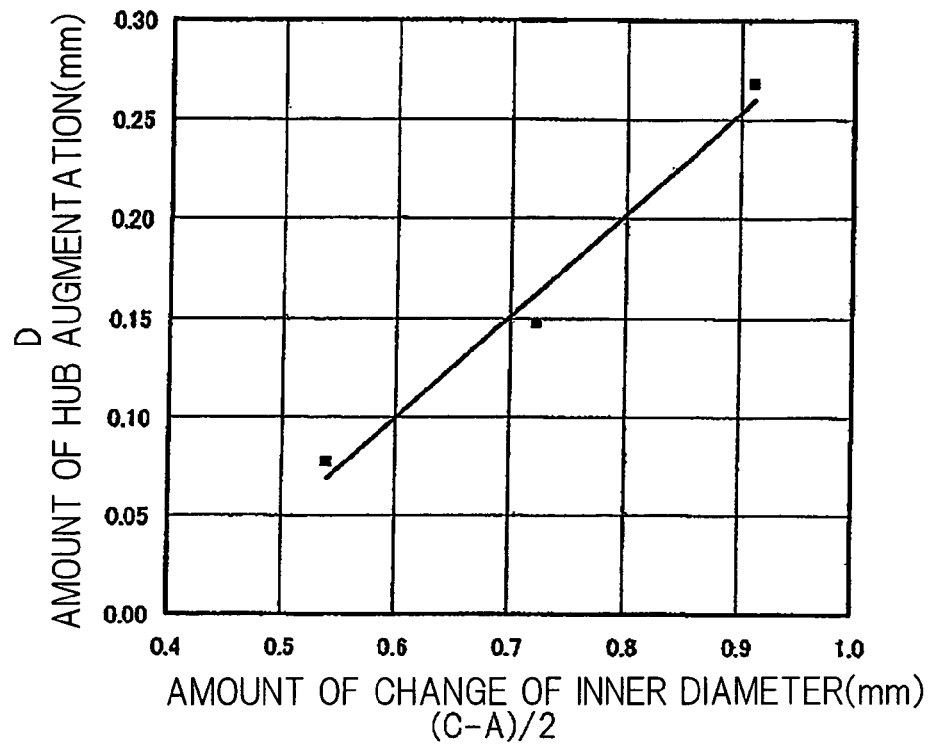
FIG. 8 is a chart showing the relation between the amount of change in inner diameter of an inboard end of a plastically deformable portion and the amount of radially outward augmentation.

One of them is a method, in which assuming that the inner diameter of the inboard end of the plastically deformable portion 9*b'* before the crimping process is expressed by $\phi A$ and the maximum inner diameter of the crimped portion 9*b* after the crimping process is expressed by $\phi C$, the crimping punch 19 is driven in so that the amount of change ($\phi C - \phi A$) of these inner diameters may fall within a preset range. Through a series of experiments, it has been revealed that there is a correlation between the amount of inner diameter change of the inboard end of the plastically deformable portion 9*b'* and the amount of radial outward augmentation D as shown in FIG. 8. The axis of abscissas in FIG. 8 represents ½ of the amount of inner diameter change. For this reason, when the crimping punch 19 is to be driven in, the amount of inner diameter change ($\phi C - \phi A$) of the inboard end of the plastically deformable portion 9*b'* is measured and by setting it to be within the predetermined range, the amount of radially outward augmentation D of the crimped portion 9*b* can be rendered to be a proper value. The range of the amount of augmentation D is, for example, within the range of 0.05 to 0.25 mm. By so doing, the required proof strength against the inner ring separation can be ensured.

Figure 9:
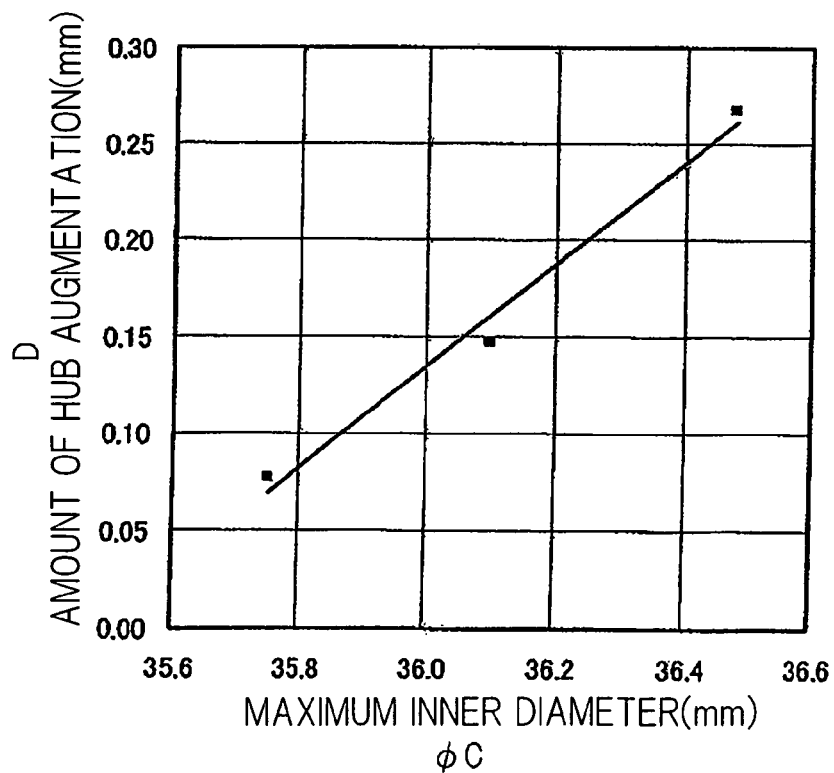
FIG. 9 is a chart showing the relation between the maximum inner diameter of a tapered inner peripheral surface of the plastically deformable portion and the amount of radially outward augmentation.
Figure 10:
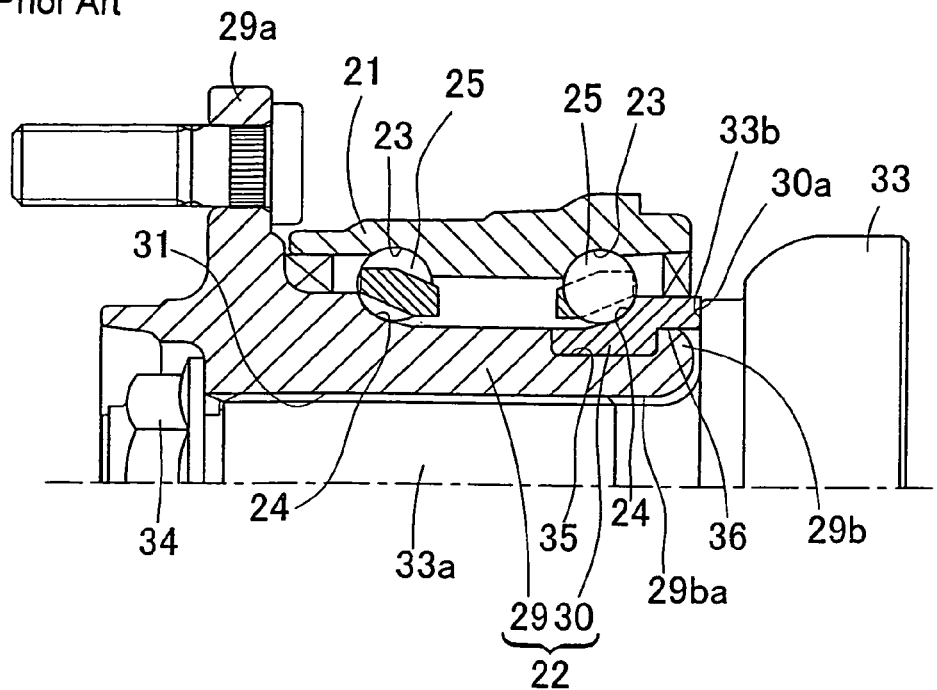
FIG. 10 is a longitudinal sectional view showing one conventional example of a wheel support bearing assembly.
Figure 11:
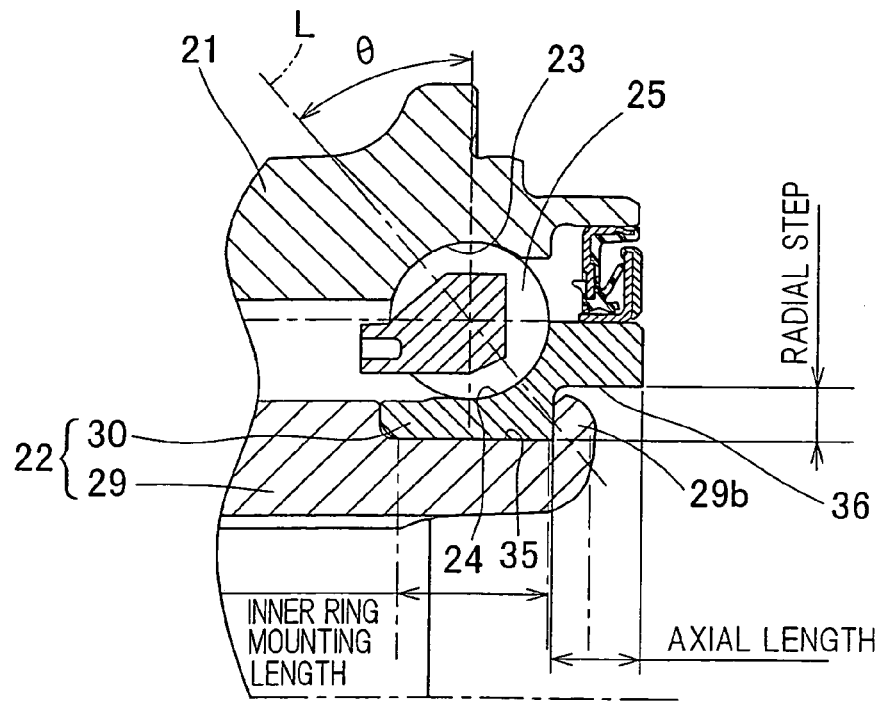
FIG. 11 is a fragmentary longitudinal sectional view on an enlarged scale, showing a portion of the conventional example.
Figure 12:
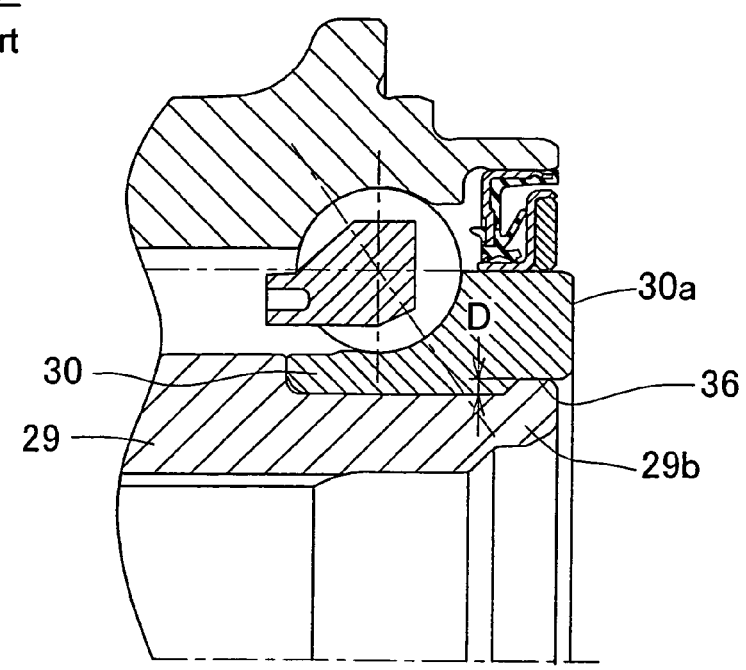
FIG. 12 is a fragmentary longitudinal sectional view on an enlarged scale, showing a portion of the suggested wheel support bearing assembly.
Figure 13:
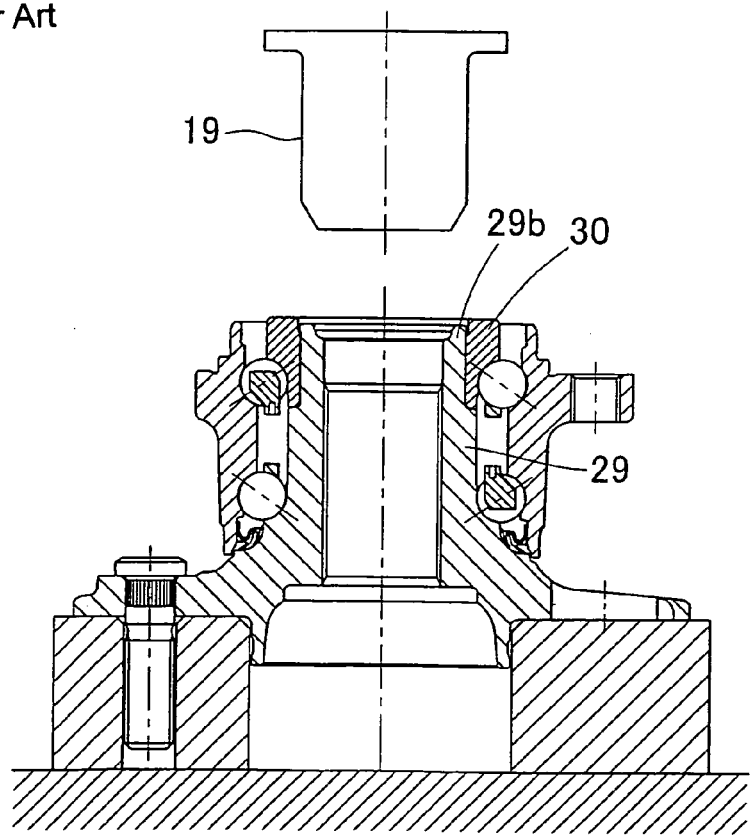
FIG. 13 is a longitudinal sectional view showing a crimping process employed in connection with the suggested wheel support bearing assembly.

The other of them is a method, in which the crimping punch 19 is driven in in such a manner that the maximum inner diameter $\phi C$ of the tapered inner peripheral surface 9*ba* of the crimped portion 9*b* best shown in FIG. 3B may fall within the predetermined range. Where the plastically deformable portion 9*b'* is to be crimped by the diameter expansion with the use of the crimping punch 19 of a kind having the forefront outer peripheral surface tapered to define the tapered surface 19*a* as best shown in FIG. 4, a series of experiments have revealed that there is a correlation between the maximum inner diameter $\phi C$ of the tapered inner peripheral surface 9*ba* of the plastically deformable portion 9*b'* and the amount of radial outward augmentation D (See FIG. 9.). For this reason, when at the time the crimping punch 19 is to be driven in, the maximum inner diameter $\phi C$ of the tapered inner peripheral surface 9*ba* of the plastically deformable portion 9*b'* is measured and is then set within the predetermined range, thus making it possible to render the amount of radially outward augmentation D of the crimped portion 9*b* best shown in FIG. 3B to be a proper value. In this way, the required proof strength against the inner ring separation can be ensured. The relationship between the maximum inner diameter $\phi C$ and the amount of radially outward augmentation D varies depending on the dimensions of the bearing assembly.

When the wheel support bearing assembly is to be mounted onto the automotive vehicle, the stem portion 13*a* of an outer ring 13, which forms one of coupling members of the constant velocity universal joint 12, has to be inserted into the center bore 11 of the hub unit 9 shown in FIG. 1 for spline engagement, followed by fastening of a nut 14, threaded onto a free end of the stem portion 13*a*, to thereby connect the inner member 2 with the constant velocity universal joint outer ring 13. With this fastening feature, an outboard oriented step face 13*b* provided in the constant velocity universal joint outer ring 13 is urged against the inboard oriented end face 10*a* of the inner ring 10 to allow the inner member 2 to be clamped between the constant velocity universal joint outer ring 13 and the nut 14.

The wheel mounting hub flange 9*a* is positioned in the vicinity of the outboard end of the hub unit 9, and the vehicle wheel (not shown) is mounted on the hub flange 9*a* by means of hub bolts 17 together with a brake rotor (also not shown) intervening between it and the hub flange 9*a*.

According to the wheel support bearing assembly of the structure hereinabove described, since the use is made of the stepped area 16 in the inner peripheral surface of the inner ring 10 shown in FIG. 2 and the crimped portion 9*b* is engaged with the axially oriented inclined face 16*a* by means of the crimping of the hub unit 9, an undesirable separation of the inner ring 10 from the hub unit 9 under the influence of an external force generated during the assemblage onto the automotive vehicle can be avoided. The stepped area 16 referred to above is so formed as to occupy a limited region of the inner peripheral edge of the inner ring 10, the stepped area 16 can be minimized in size while the proof strength against the separation of the inner ring 10 is secured. For this reason, while the stepped area 16 is employed, reduction in surface area of the end face 10a of the inner ring 10 can be minimized, and an undesirable increase of the contact surface pressure between it and the step face 13b of the constant velocity universal joint outer ring 13 can be suppressed to void generation of frictional wear and/or abnormal noises, thus suppressing any reduction in longevity of the bearing assembly.

In particular, since the crimping process to form the crimped portion 9b is carried out by the use of the crimping punch 19, best shown in FIG. 4, of a kind, in which the outer peripheral surface thereof is rendered to be a tapered surface 19a and the corner delimited between this tapered surface 19a and the forefront surface 19b is chamfered as at R2 (FIG. 6) and it can be driven into the inner periphery of the inboard end of the hub unit 9, the crimping punch 19 will not interfere with a portion of the hub unit 9 outboard of the crimped portion 9b during the crimping taking place and the diameter expansion crimping can be performed to a required processability. The crimped portion 9b, best shown in FIG. 2 and obtained by this diameter expansion crimping involves the amount of radially outward augmentation D enough to ensure the required proof strength against the inner ring separation.

Also, since the wheel support bearing assembly of the structure described above is of a double-row back-to-back angular contact ball bearing type and since the stepped area 16 is so designed as to have an axial range W that does not interfere with the line of extension of the straight line L forming the rolling element contact angle θ, a possible deformation of the inner ring 10 under the influence of a load during the operation can be minimized and the longevity can be correspondingly increased. Also, since the axial length of the stepped area 16 in the inner ring 10 is small, the length of mounting of the inner ring 30, or a mounting length over which the inner ring 10 is mounted on the hub unit 9, can be secured and, accordingly, the mounting surface area for the inner ring 10 can also be secured, allowing generation of creepage of the inner ring 10 to be suppressed. In view of this, the longevity can also be increased. Yet, there is no need to increase the overall widthwise dimension of the inner ring 10 in order to secure the mounting length or the like and, therefore, no extra space is required in the axial direction.

Since when the plastically deformable portion 9b' of the hub unit 9 shown in FIG. 3A is crimped to form the crimped portion 9b shown in FIG. 3B, this crimped portion 9b does not interfere with the inner diametric straight portion 16b of the inner ring stepped area 16, no extra load acts on the various portions of the hub unit 9, except for the crimped portion 9b, and the various portions of the inner ring 10. As a result, deformation of the center bore 11 in the hub unit 9, in which the stem portion 13a of the constant velocity universal joint 12 shown in FIG. 1 is engaged, and expansion of the inner ring 10 can be minimized. Accordingly, adverse influences on the bearing functionality can be avoided. At the time of this crimping process, the plastically deformable portion 9b' of the hub unit 9 shown in FIG. 3A can be easily plastically deformed along the inclined face 16a of the inner ring stepped area 16. For this reason, the crimping process can be performed properly and securement of the proof strength against the separation can be ensured further.

Since the plastically deformable portion 9b', of which inner peripheral surface is defined by the large diameter stepped bore portion 11c of the center bore 11, is a portion of the hub unit 9 which has a large inner diameter, but has a wall thickness reduced in a radial direction, and has an overall small surface area, the crimping process can be performed easily. Also, since the plastically deformable portion 9b' is small in size, the amount of augmentation D will not increase beyond the required value even when diametrically expanded, and even though the step of the inner diametric stepped area 16 is chosen to be small, it is possible that the crimped portion 9b will not contact the straight portion 16b of the inner ring stepped area 16. Also, since the center bore 11 is so designed and so shaped as to represent the double stepped configuration having its inner diameter progressively increasing towards the inboard side, the stem portion 13a of the constant velocity universal joint 12 can easily be inserted into the general diameter portion 11a of the center bore 11 when such stem portion 13a is to be inserted into such general diameter portion 11a for spline engagement, facilitating the assemblage.

Yet, since in this wheel support bearing assembly the raceway surfaces 4 of the hub unit 9 are rendered to be a surface hardened surface formed by means of the hardening treatment, the rolling lifetime can be extended. On the other hand, since the plastically deformable portion 9b' is rendered to be a non-hardened portion, the crimping process can be easily accomplished. In view of the fact that the inner ring 10 is a small component part having the raceway surfaces 4 defined therein and has its inner diametric surface adapted to engage the hub unit 9, the inner ring 10 in its entirety from surface to core thereof can be hardened by means of the hardening treatment as hereinbefore described and, hence, the rolling lifetime can be extended and the wear resistance of the mounting surface can be rendered excellent.

The present invention can be applied to a wheel support bearing assembly for the support of a driven wheel. In such case, the use of the center bore 11 in the center portion of the hub unit 9 shown in FIG. 1 is dispensed with, but a shallow blind hole is preferably formed in an inboard end face of the hub unit 9 with a large diameter stepped portion defined in its inner peripheral surface and the crimped portion is formed in an inboard end portion of the large diameter stepped portion of the hub unit.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A method of manufacturing a wheel support bearing assembly comprising an outer member having an inner periphery formed with a plurality of rows of raceway surfaces defined therein; an inner member having an outer periphery formed with raceway surfaces opposed to the raceway surfaces and made up of an hub unit and an inner ring, the hub unit having a wheel mounting flange formed on an outer periphery thereof and also having a center bore defined in a center portion thereof, the inner ring being mounted on an inner ring mounting area of a stepped configuration that is defined in an inboard side of an outer periphery of the hub unit; and a plurality of rows of rolling elements interposed between those opposed raceway surfaces; the rows of the raceway surfaces being defined in the hub unit and the inner ring, respectively, the inner ring having an inboard end provided at an inner peripheral edge thereof with an annular stepped area, the hub unit having an inboard end portion provided with a crimped portion engageable with an axially oriented inclined face of the stepped area of the inner ring, the method comprising:

forming the crimped portion by driving a crimping punch into an inner periphery of a plastically deformable portion of the inboard end portion of the hub unit from an inboard side thereof such that the plastically deformable portion is crimped to assume a diametrically expanded state, the plastically deformable portion being of a cylindrical shape prior to a crimping process; and regulating, during the driving-in of the crimping punch, the amount of radially outward augmentation of the crimped portion by measuring the amount of change in an inner diameter of an inboard end of the plastically deformable portion and setting the amount of change to a value within a preset range.

2. A method of manufacturing a wheel support bearing assembly comprising an outer member having an inner periphery formed with a plurality of rows of raceway surfaces defined therein; an inner member having an outer periphery formed with raceway surfaces opposed to the raceway surfaces and made up of an hub unit and an inner ring, the hub unit having a wheel mounting flange formed on an outer periphery thereof and also having a center bore defined in a center portion thereof, the inner ring being mounted on an inner ring mounting area of a stepped configuration that is defined in an inboard side of an outer periphery of the hub unit; and a plurality of rows of rolling elements interposed between those opposed raceway surfaces; the rows of the raceway surfaces being defined in the hub unit and the inner ring, respectively, the inner ring having an inboard end provided at an inner peripheral edge thereof with an annular stepped area, the hub unit having an inboard end portion provided with a crimped portion engageable with an axially oriented inclined face of the stepped area of the inner ring, the method comprising:

forming the crimped portion by driving a crimping punch with a forefront outer peripheral surface tapered to represent a tapered surface into an inner periphery of a plastically deformable portion of the inboard end portion of the hub unit from an inboard side thereof such that the plastically deformable portion is crimped to assume a diametrically expanded state, the plastically deformable portion being of a cylindrical shape prior to a crimping process; and regulating, during the driving-in of the crimping punch, the amount of radially outward augmentation of the crimped portion by measuring a maximum inner diameter of an tapered inner peripheral surface of the plastically deformable portion and setting the maximum inner diameter to a value within a predetermined range.

\* \* \* \* \*